(12) United States Patent
Wei et al.

(10) Patent No.: US 10,213,038 B2
(45) Date of Patent: Feb. 26, 2019

(54) LOGISTICS RACK AND APPLICATION METHOD THEREOF

(71) Applicants: Tao Wei, Nanning (CN); Binwu Huang, Nanning (CN); Hengyuan Wu, Nanning (CN)

(72) Inventors: Tao Wei, Nanning (CN); Binwu Huang, Nanning (CN); Hengyuan Wu, Nanning (CN)

( * ) Notice: Subject to any disclaimer, the term of this patent is extended or adjusted under 35 U.S.C. 154(b) by 0 days.

(21) Appl. No.: 15/796,762

(22) Filed: Oct. 28, 2017

(65) Prior Publication Data

US 2018/0064277 A1  Mar. 8, 2018

Related U.S. Application Data

(63) Continuation of application No. PCT/CN2016/000231, filed on Apr. 29, 2016.

(30) Foreign Application Priority Data

Apr. 30, 2015  (CN) .......................... 2015 1 0219695
Jul. 20, 2015  (CN) .......................... 2015 1 0426877

(51) Int. Cl.
*G08B 13/14* (2006.01)
*A47G 29/14* (2006.01)
(Continued)

(52) U.S. Cl.
CPC .......... *A47G 29/141* (2013.01); *B65G 1/137* (2013.01); *G06Q 50/28* (2013.01);
(Continued)

(58) Field of Classification Search
CPC .. G06Q 10/08; G06Q 10/083; G06Q 10/0833; G06Q 10/0836; G06Q 20/00;
(Continued)

(56) References Cited

U.S. PATENT DOCUMENTS 4,836,352 A    6/1989  Tateno et al.
4,894,717 A *  1/1990  Komei ................ A47G 29/141
                                                  348/14.01
(Continued)

FOREIGN PATENT DOCUMENTS

CN     203165015 U     8/2013
CN     103729754 A     4/2014
(Continued)

*Primary Examiner* — Daniel Previl
(74) *Attorney, Agent, or Firm* — Wayne & Ken, LLC; Tony Hom

(57) ABSTRACT

The present invention discloses a logistics rack and an application method thereof. The logistics rack comprises a cabinet frame, wherein the cabinet frame is divided into a plurality of storage areas; a plurality of encoded cards A are provided on the top of the cabinet frame, a hanging member is connected below the encoded card A, and an express fixing device is connected to the bottom of the hanging member; a cabinet door with a password recognition device is mounted on the cabinet frame. A control system is mounted inside the cabinet frame, and an input end of the control system is connected to an input end of the password recognition device, and the output end is connected to a lock of the cabinet door. The logistics rack can save logistics time, improve logistics efficiency, and reduce logistics costs, and is safe and reliable.

17 Claims, 7 Drawing Sheets

(51) Int. Cl.
*B65G 1/137* (2006.01)
*H04W 4/38* (2018.01)
*G06Q 50/28* (2012.01)
*G07C 9/00* (2006.01)

(52) U.S. Cl.
CPC ..... *G07C 9/00142* (2013.01); *G07C 9/00182* (2013.01); *H04W 4/38* (2018.02); *A47G 2029/144* (2013.01); *A47G 2029/147* (2013.01); *A47G 2029/149* (2013.01)

(58) Field of Classification Search
CPC ...... G06Q 50/28; G07F 17/12; A47G 29/141; G06F 21/62
USPC ..... 340/568.1, 569, 570, 666, 668; 700/231, 700/232, 237
See application file for complete search history.

(56) References Cited

U.S. PATENT DOCUMENTS

| | | | | |
|---|---|---|---|---|
| 5,611,440 | A * | 3/1997 | Møller | A47B 45/00 108/181 |
| 5,774,053 | A * | 6/1998 | Porter | A47G 29/141 340/568.1 |
| 6,267,253 | B1 * | 7/2001 | Jellicorse | A47F 5/0018 211/13.1 |
| 6,999,825 | B2 * | 2/2006 | Inomata | G07F 17/12 340/5.73 |
| 8,554,643 | B2 * | 10/2013 | Kortelainen | B65G 1/0435 414/277 |
| 2004/0243426 | A1 * | 12/2004 | Hashimoto | A47G 29/141 232/20 |
| 2007/0266081 | A1 * | 11/2007 | Murchison, III | G07F 17/12 709/203 |
| 2009/0141117 | A1 * | 6/2009 | Elberbaum | G07C 9/00571 348/14.04 |
| 2012/0311358 | A1 * | 12/2012 | Brindel | H04J 14/02 713/320 |
| 2013/0287537 | A1 * | 10/2013 | Hecht | G01N 35/04 414/788.4 |
| 2014/0330603 | A1 * | 11/2014 | Corder | G06Q 10/0631 705/7.12 |
| 2016/0216106 | A1 * | 7/2016 | Motoyama | G01B 11/28 |

FOREIGN PATENT DOCUMENTS

| | | |
|---|---|---|
| CN | 103839146 A | 6/2014 |
| CN | 203941557 U | 11/2014 |
| CN | 204280463 U | 4/2015 |
| CN | 104986493 A | 10/2015 |
| CN | 204847046 U | 12/2015 |
| DE | 202007000731 U1 | 3/2008 |
| JP | 2004236797 A | 8/2004 |

* cited by examiner

LOGISTICS RACK AND APPLICATION METHOD THEREOF

TECHNICAL FIELD

The present invention relates to a logistics apparatus and an application method thereof, and more specifically to a logistics rack and an application method thereof.

BACKGROUND OF THE INVENTION

The existing logistics cabinets mainly follow the traditional mailbox mode, each individual has an exclusive drawer or a box in a logistics cabinet. When the parcel dispatcher wants to send the parcel, the parcel dispatcher opens the box of the recipient, places the parcel in the box, closes the box, and waits the recipient to pick up. The logistics delivery makes progress with the development of the society, firstly, the information of placing the parcel can be timely notified to the recipient through a modern communication technology; secondly, an electronic mode is adopted to open the box. In this way, the utilization rate of an exclusive drawer or a box in the logistics cabinet is low. However, for most people without the box, they are easily to be disconnected with the parcel dispatcher, when the parcel dispatcher delivers the parcel to the recipient who is not in the pick-up position, the parcel dispatcher needs to be repeatedly matched with the recipient when the parcel dispatcher delivers the parcel, and waits for the recipient to personally receive, so that the time of the parcel dispatcher is severely wasted, and the logistics time is prolonged, the logistics efficiency is influenced, the logistics cost is increased, and therefore the problem that the final 100-meter parcel delivery in the logistics is urgent to be solved.

SUMMARY OF THE INVENTION

The present invention aims to solve the technical problems of not high utilization rate, long logistics time and low logistics efficiency of final 100-meter parcel delivery in the logistics by providing a logistics rack and an application method thereof.

The technical scheme for solving the above technical problem is as follows: a logistics rack, comprising a cabinet frame. The cabinet frame is divided into a plurality of storage areas, and a plurality of first encoded cards are provided on the top of the cabinet frame. A hanging member is connected with the bottom of each of the plurality of first encoded cards, and a parcel fixing device is connected to the bottom of the hanging member.

According to the technical scheme, the cabinet frame is provided with a cabinet door with a password recognition device; a control system is mounted inside the cabinet frame, and the control system comprises a central control machine. An input end of the central control machine is connected to an output end of the password recognition device, and the output end of the central control machine connected to a lock of the cabinet door.

According to a further technical scheme, the control system further comprises a using state recognizer for the parcel fixing device, and the using state recognizer for the parcel fixing device is mounted on the parcel fixing device for identifying a using state of the parcel fixing device and judging whether the parcel fixing device is wrongly opened or not, and an output end of the using state recognizer for the parcel fixing device is connected with the input end of the central control machine.

According to the further technical scheme, the using state recognizer for the parcel fixing device comprises a pressure sensor or a light sensor, and an output end of the pressure sensor or the light sensor is connected with the input end of the central control machine.

According to the further technical scheme, the control system further comprises a using state recognizer for the hanging member mounted on the hanging member for judging whether the hanging member is cut or not, and the output end of the using state recognizer for the hanging member is connected with an input end of the central control machine.

According to the further technical scheme, the hanging member is an elastic hanging member; a using state recognizer for the hanging member is an elastic force sensor, and an output end of the elastic force sensor is connected with the input end of the central control machine.

According to the further technical scheme, a keyboard is also mounted on the cabinet frame, and the keyboard is connected with the central control machine for entering the telephone number of recipient, so that sending information is automatically generated and sent to the recipient by the central control machine.

According to the further technical scheme, a camera for recording a storage picture of a parcel is installed in the cabinet frame. The camera is connected with central control machine, and a monitoring image is stored by the control system.

According to the further technical scheme, the parcel fixing device is provided with a second encoded card with the same number of one of the plurality of first encoded cards; the using state recognizer for the parcel fixing device is further provided with an indicator lamp, and an input end of the indicator lamp is connected with the output end of the central control machine 9, and the indicator lamp flickers on the using state recognizer for the parcel fixing device 5 when the recipient picks up the parcel.

According to the further technical scheme, each of the storage area of the cabinet frame comprises a frozen area for storing fresh food parcel, a temperature controller is installed in the frozen area, the temperature controller is connected with the central control machine, and the temperature of the frozen area is monitored by the central control machine.

According to the further technical scheme, the central control machine is further connected with the Internet; the logistics rack is provided with an APP application platform, and each logistics rack is further provided with a container number card with a unique number convenient for management of APP application platform; and the logistics rack is further provided with WiFi.

Further, the logistics rack further comprises a parcel information input module, a parcel dynamic position memory module and a parcel position display module; the control system is respectively connected with the parcel information input module, the parcel dynamic position memory module, and the parcel position display module; the parcel information input module is configured to input parcel information into the control system, and the parcel dynamic position memory module is configured to memorize the position of a parcel placed in the cabinet frame and input the position information of the parcel into the control system to establish a relationship between the control system and the parcel with the position information of the parcel; the parcel position display module is configured to control the system to display the parcel position after the control system retrieves the parcel information when the parcel is picked up, and the parcel information input module comprises a manual input equipment or a bar code scanning equipment or an RFID chip reading equipment.

Further, the parcel dynamic position memory module comprises a weighing device or a machine vision device or a wireless clamp with codes and a wireless hook; the weighing device comprises a total weighing device mounted on the bottom of the entire cabinet frame, an encoded area weighing device mounted in each storage area of the cabinet frame, one or more encoded area sub-weighing devices respectively mounted on the same storage area of the cabinet frame; the machine vision device and the wireless clamp and the wireless hook are installed on the border of the cabinet frame respectively; the weighing device, the machine vision device, and the wireless clamp and the wireless hook are respectively connected with the control system.

Further, the logistics rack further comprises a pick-up monitoring and correcting system; the pick-up monitoring and correcting system is connected with the control system; the pick-up monitoring and correcting system is configured to give an alarm reminder after the parcel taken away is not matched with the information recorded by the parcel dynamic position memory module when a parcel is picked up or after the parcel is abnormally increased.

Further, the logistics frame further comprises a smell sensor, the smell sensor is connected with the control system, and the control system is further connected with a hazardous goods smell alarm; the control system is further connected with the Internet; the logistics rack is provided with an APP application platform and WiFi.

Another technical scheme of the invention is as follows: an application method of a logistics rack comprises the following steps:

a. selecting an unoccupied parcel fixing device (5) on the logistics rack by a parcel dispatcher, and clamping a parcel;

b. informing a recipient of the number on one of the plurality of first encoded cards (3) corresponding to the parcel fixing device (5); and c. picking up the parcel according to the number corresponding to the parcel fixing device (5) notified by the parcel dispatcher.

According to the technical scheme, a cabinet door with a password recognition device is installed on the logistics rack, and the parcel dispatcher applies a secret key to the owner of the logistics rack in advance in the step a, and the cabinet door on the logistics rack is opened through the secret key; and the recipient also applies the secret key to the owner of the logistics rack in advance in the step c, and the cabinet door on the logistics rack is opened through entering the secret key.

According to the technical scheme, a cabinet door with a password recognition device is installed on the logistics rack, and a control system is installed in the cabinet frame (1).

The step a further comprises: applying a secret key by the parcel dispatcher in advance, and opening the cabinet door on the logistics rack through the secret key.

The step b further comprises: sending a message of the recipient and the number corresponding to the parcel fixing device to the control system through a keyboard (8) by the parcel dispatcher, automatically generating a secret key and parcel information by the control system and sending the secret key and the parcel information to the recipient.

The step c further comprises: opening the cabinet door according to the secret key sent by the control system, and the indicator lamp on the parcel fixing device on the logistics rack are automatically flashing, comparing the recipient with the number sent by the control system, picking up the parcel, and automatically resetting the elastic hanging member.

The method further comprises step d: sending information from the control system to the parcel dispatcher after the parcel is picked up.

In the process of the step a to the step c, a central control machine further identifies the using state of the parcels fixing device and judges whether the parcel fixing device is wrongly opened or not through a using state recognizer for the parcel fixing device; judges whether the hanging member is cut or not through a using state recognizer for the hanging member; and records whole process pictures of the parcel from storage to pick-up through the camera; if abnormal conditions exist, the central control machine sends out alarm information.

According to the further technical scheme, the logistics rack is further provided with an APP application platform.

The step a further comprises: registering in advance through a web page or the APP application platform to apply for the secret key of opening the cabinet door of logistics rack by the parcel dispatcher.

The step c further comprises: registering in advance through the web page or the APP application platform by the recipient, finding or instantly receiving the secret key of opening the cabinet door when the parcel is available, and opening the cabinet door through the secret key, the parcel fixing device and one of the plurality of first encoded cards of the recipient on the logistics rack are automatically flashing, comparing the recipient with the number sent by the control system, picking up the parcel, and automatically resetting the elastic hanging member.

User registration of the APP application platform is bounded with a mobile number and a message authentication code is sent to authenticate; in the process of the step a to the step c, the status of the parcel in the logistics rack is inquired through the webpage or the APP application platform.

According to the further technical scheme, when the logistics rack is provided with WiFi function, the step C further comprises: logging in the APP application platform of the logistics rack by the recipient, arriving at WiFi area of the logistics rack, automatically opening the cabinet door, and the parcel fixing device and one of the plurality of first encoded cards of the recipient on the logistics rack are automatically flashing, comparing the recipient with the number sent by the control system, picking up the parcel, and automatically resetting the elastic hanging member.

With the above structure, the logistic rack and an application method thereof of the present invention have the following beneficial effects compared with the prior art.

1. The utilization rate is high:

the logistics rack provided by the present invention comprises a cabinet frame, and the cabinet frame is divided into a plurality of storage areas, a plurality of first encoded cards are arranged on the top of the cabinet frame, a hanging member is connected to the lower surface of each of the plurality of encoded cards, and a parcel fixing device is connected to the bottom of the hanging member. When the parcel dispatcher delivers the parcel to the logistics rack, fixes the parcel with an unoccupied express fixing device, informs the recipient of the number, and the recipient can quickly find the own express item on the logistics rack according to the number; therefore, the logistics rack can be used by all the public without application, and is not exclusive to a certain person. There is no need to monopolize a drawer or a box for each person, so the utilization rate is very high.

2. The logistics time can be saved, and the delivery problem of the final 100 meters parcel delivery in the logistics is solved:

According to the logistics rack of the present invention, when the parcel dispatcher delivers the parcel to the logistics rack, the parcel can be fixed by using an unoccupied parcel fixing device, then the number is informed to the recipient, and the recipient picks up the express item in spare time according to the number information, so that the parcel can be quickly picked up on the logistics rack; therefore, the parcel dispatcher does not need to wait for the recipient to personally receive during the parcel delivery of the parcel, the time of parcel dispatcher is saved, and the logistics time is saved. Besides, the logistics efficiency is also improved, the logistics cost is reduced, and the delivery problem of the final 100 meters parcel delivery in the logistics is truly solved.

3. The logistics rack is convenient to use:

due to the fact that the logistics cabinet specially used in the prior art is limited by space, and the types of the placed parcel are limited. However, the present invention can be used by the public at the same time, and the private parcel delivery can also be used except the parcel service. Besides, the recipient can apply a secret key to the logistics cabinet and send to the sender, and then the sender can turn on the logistics cabinet and place goods to wait for the recipient to pick it up. The logistics rack is quite convenient to use, and the life of the public is greatly facilitated; in addition, due to the use of the present invention, the parcel can be stacked, and the occupied space can be fully utilized and saved.

4. The logistics rack is safe and reliable:

when the invention is in use, the parcel dispatcher firstly places the parcel to the logistics rack, the logistics rack automatically sends the information to the recipient. According to the information sent by the logistics rack, the recipient opens the logistics rack, receives his own parcel, when the recipient returns home from work; and meanwhile, the logistics rack also sends the parcel receiving information back to the parcel dispatcher; the logistics rack is used for monitoring the receiving condition in the whole process, when a wrong pick-up occurs, an alarm is given out, so the parcel is very safe in the logistics rack.

5. The installation range is wide:

The logistics rack can be placed at a doorway or a pedestrian passage of a community, a school, a factory, an office building and an organization, so that each person can pick up their own parcel conveniently, the installation range is wide, and popularization and application are easy.

The technical features of the logistics rack and application method thereof are further described in combination with the drawings and the embodiments.

DETAILED DESCRIPTION OF THE INVENTION

Embodiment 1

Figure 1:
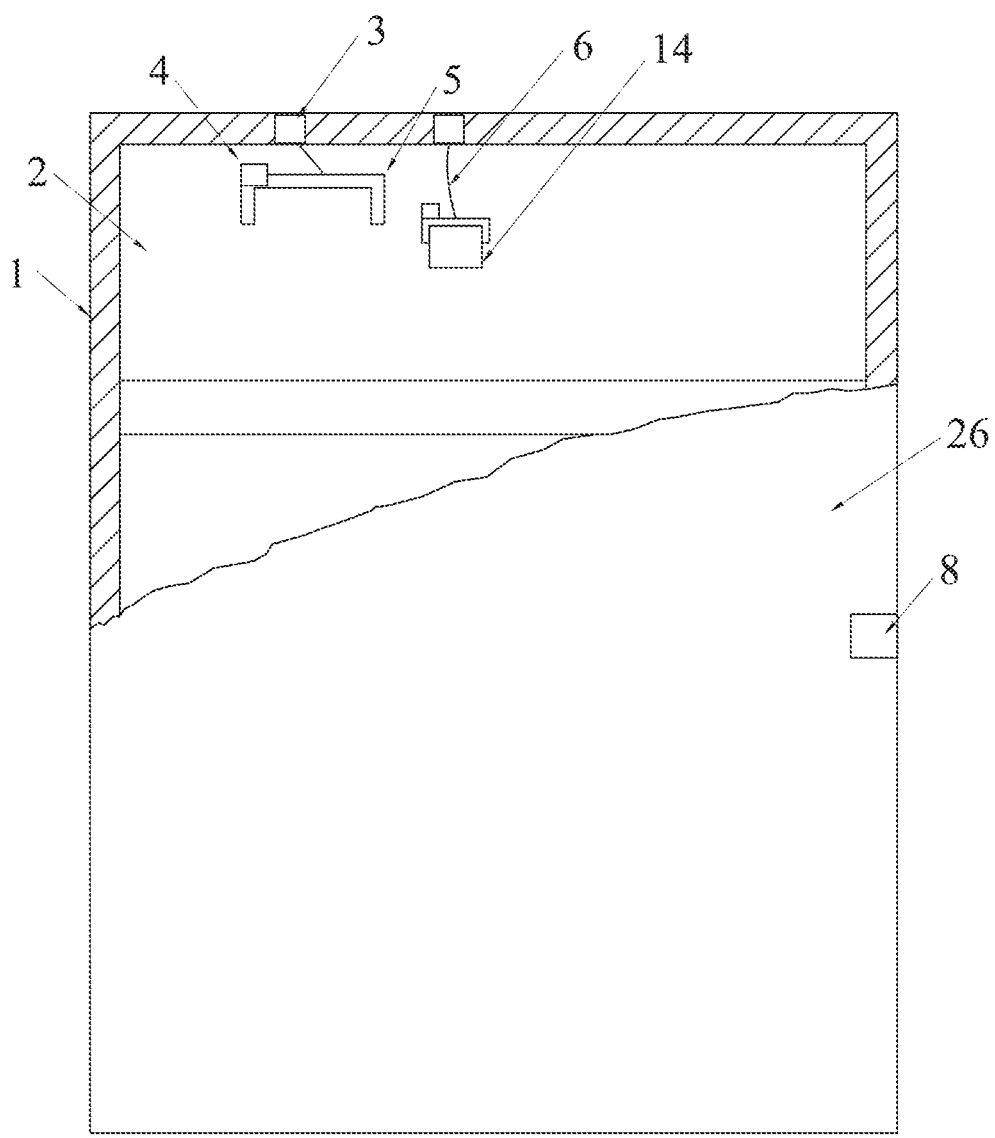
FIG. 1 is a structural schematic diagram of a logistics rack according to an embodiment of the present invention.

A logistics rack comprises a cabinet frame 1, the cabinet frame 1 is divided into three storage areas 2, a plurality of first encoded cards are provided on the top of the cabinet frame 1, a hanging member 6 is connected with the bottom of each of the plurality of first encoded cards 3. A parcel fixing device 5 is connected to the bottom of the hanging member 6, and the parcel fixing device 5 is a clamp, the parcel fixing device 5 is provided with an encoded card B4 which is the same number with one of the plurality of first encoded cards (see FIG. 1).

The method for using the logistics rack comprises the following steps:

step a. a parcel dispatcher selects an occupied parcel fixing device, a clamp, on the logistics rack, and a parcel 14 is clamped;

step b. informing recipient of the number on one of the plurality of first encoded cards 3 corresponding to the parcel fixing device 5;

step c. the parcel mail is picked up according to the number corresponding to the parcel fixing device 5 notified by the parcel dispatcher.

Embodiment 2

The basic structure of a logistics rack is the same as that of the first embodiment, and the logistics rack comprises a cabinet frame 1. The cabinet frame 1 is divided into three storage areas 2, a plurality of first encoded cards 3 are provided on the top of the cabinet frame 1, a hanging member 6 is connected to the bottom of each of the plurality of first encoded cards 3, and a parcel fixing device 5 is connected to the bottom of the hanging member 6, the parcel fixing device 5 is provided with a second encoded card 4 which is the same number with the one of plurality of first encoded cards (see FIG. 1). And the difference is the hanging member 6 is an elastic telescopic rope, and the parcel fixing device 5 is a hook, the hook can be folded, and when the hook head is opened, the hook head is in a use state, and the hook head is in a non-use state when closed, and the parcel is not damaged by inserting the hook into the parcel package. The cabinet frame 1 is provided with a cabinet door 26 with a password recognition device 8, the cabinet door 26 is a fence type or a sealed type, the password recognition device 8 comprises a cabinet door lock and a keyboard, and the cabinet door lock is a coded lock. The password recognition device is a keyboard arranged on the cabinet frame 1, the keyboard is used for inputting a password, and the secret key is applied in advance by parcel dispatcher and the recipient.

The application method of the logistics rack of embodiment 2 comprises the following steps:

step a. a parcel dispatcher applies a secret key to the owner of the logistics rack in advance, and the key is input on the keyboard to open the cabinet door 26 on the logistics rack; the parcel dispatcher selects an occupied parcel fixing device, a hook, on the logistics frame, and the parcel is fixed;

step b. informing a recipient of the number of the parcel fixing device;

step c. the recipient applies a secret key to the logistics rack owner in advance, and the keys are input on the input keyboard to open the cabinet door on the logistics rack; the recipient picks up the parcel according to the number of the parcel fixing device which is informed by the parcel dispatcher, and the elastic hanging member is automatically reset.

Embodiment 3

Figure 2:
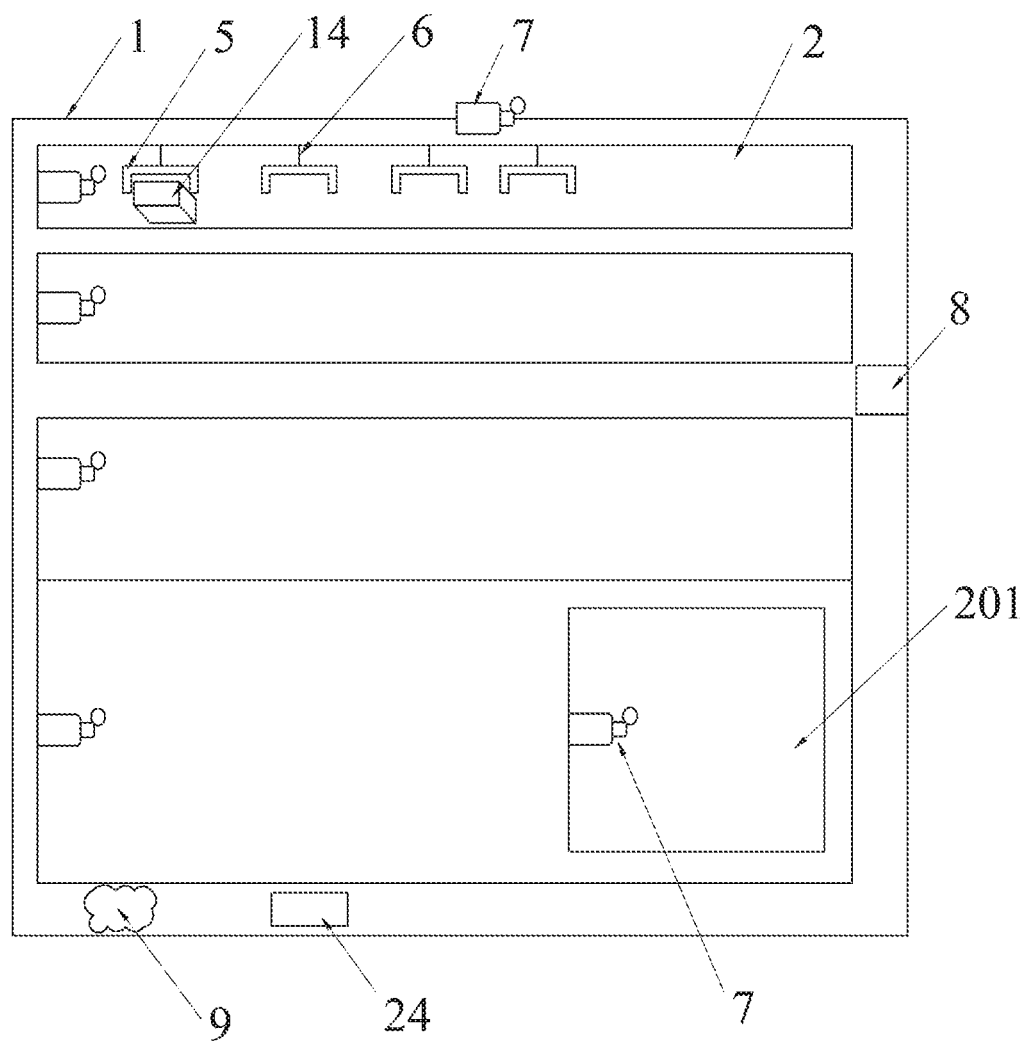
FIG. 2 is a structural schematic diagram of a logistics rack according to an embodiment of the present invention.
Figure 3:
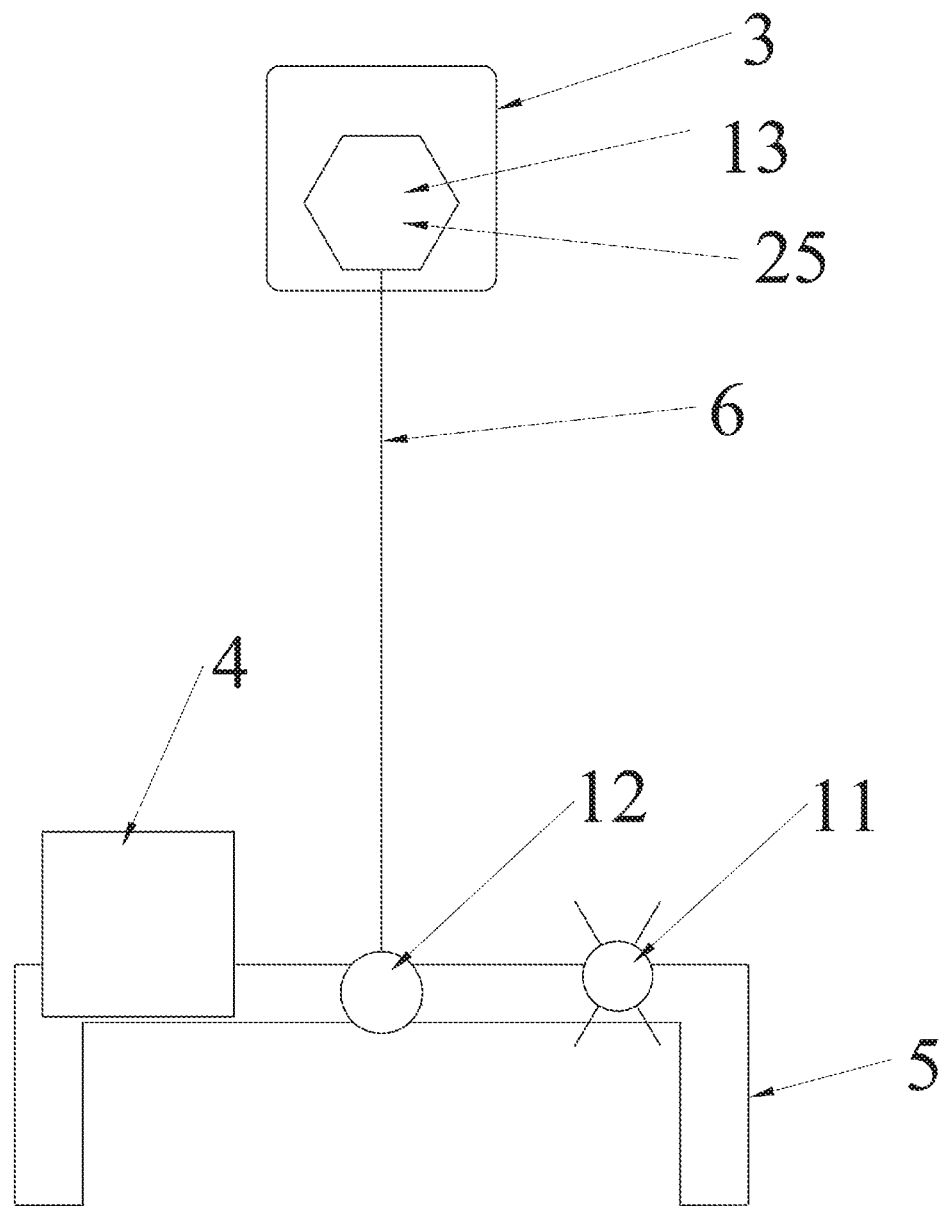
FIG. 3 is a schematic diagram of connection relation between the pressure sensor, the elastic force sensor and the parcel fixing device of an embodiment.

A logistics rack (see FIG. 1, FIG. 2 and FIG. 8) comprises a cabinet frame 1, the cabinet frame 1 is provided with a cabinet door 8 with a password recognition device, the cabinet door is a fence type or a sealed type, and the cabinet door lock is a coded lock. The password recognition device is a keyboard 8 arranged on the cabinet frame 1, the password recognition device 8 comprises a cabinet door lock and a keyboard, and the output end of the central control machine 9 is connected to the cabinet door lock; the keyboard is used for inputting a password, and the secret key is a dynamic password for recipient.

The cabinet frame 1 is divided into four storage areas 2, a plurality of first encoded cards 3 are provided on the top of the cabinet frame 1, a hanging member 6 is connected to the bottom of each of the plurality of first encoded cards 3, and a parcel fixing device 5 is connected to the bottom of the hanging member 6, the parcel fixing device 5 is provided with a second encoded card 4 which is the same number with the encoded card A.

A control system is mounted inside the cabinet frame 1, and the control system comprises a central control machine 9, a using state recognizer for the parcel fixing device 5 and a using state recognizer 25 for the hanging member 6; the input end of the central control machine is connected to an input end of the password recognition device, and the output end is connected to a lock of the cabinet door.

The using state recognizer for the parcel fixing device 5 is a pressure sensor 12, the pressure sensor 12 is installed on the parcel fixing device 5, and is used for identifying the using state of the parcel fixing device 5 and judging whether the parcel fixing device is wrongly opened or not, the output end of the pressure sensor 12 is connected with the input end of the central control machine 9, when the output signal detected by the pressure sensor 12 is changed, indicating that the parcel fixing device 5 is in an occupied state or a wrong-opening state.

The using state recognizer 25 for the hanging member 6 is an elastic force sensor 13, and the elastic force sensor 13 is installed on the hanging member 6, and is used for judging the using state of the hanging member and judging whether the hanging member is cut or not, and the output end of the elastic force sensor 13 is connected with the input end of the central control machine, when the output signal detected by the elastic force sensor 13 is changed, the hanging member 6 is in an unoccupied state or the hanging member 6 is cut off.

The keyboard installed on the cabinet frame 1 is also connected with the central control machine 9, so that the telephone number of recipient can be input, and the telephone number is automatically generated and sent to the recipient by the central control machine.

Therefore, the using state recognizer for the parcel fixing device 5, the using state recognizer for the elastic hanging member form an alarm input device, when an invasion cabinet is arranged, the clamp is opened, the hanging member is broken, and the central control machine sends out alarm information.

A camera 7 for recording a parcel storage picture is further installed in the cabinet frame, the camera 7 is connected with the central control machine 9, and the monitoring image is stored by the control system.

An indicator lamp 11 is further arranged next to the using state recognizer for the parcel fixing device 5, the input end of the indicator light 11 is connected with the output end of the central control machine 9, and the indicator lamp flickers on the using state recognizer for the parcel fixing device when the recipient picks up the parcel.

The cabinet frame comprises a frozen area 201 for placing fresh food parcel, a temperature controller 24 is installed in the frozen area, the temperature controller 24 is connected with the central control machine, and the temperature of the frozen area can be monitored by the central control machine.

The method of using the logistics rack in the embodiment 3 comprises the following steps:

step a, a secret key is applied to a parcel dispatcher in advance, and a cabinet door on the logistics rack is opened through the secret key;

step b, the parcel dispatcher sends the message of the recipient and the number corresponding to the parcel fixing device to the control system through the keyboard, after receiving the information, the control system automatically generates a dynamic secret key and parcel information (such as a company parcel dispatcher in a time to your shipment placed in a logistics cabinet, open the cabinet password is XXXXXX) and sends it to the recipient;

step c, the recipient opens the cabinet door according to the secret key sent by the control system, and the express parcel device and one of the plurality of first encoded cards of the receiver on the logistics rack are automatically flashing, after the receiver compares the received numbers with the numbers sent by the control system, the parcel is picked up and the elastic hanging member is automatically reset;

step d, the control system sends the information to the parcel dispatcher after the parcel is picked up;

in the process of the step a to the step c, the central control machine further identifies the using state of the express fixing device 5 through an using state recognizer for the parcel fixing device 5 and judges whether the parcel fixing device 5 is wrongly opened or not; and judges whether the hanging member is cut or not through the using state recognizer 25 for the hanging member 6; all pictures of the parcel from the storage to the collecting process are recorded through the camera 7; if abnormal conditions exist, the central control machine sends out alarm information; the identification process of the using state recognizer for parcel fixing device 5 is as follows:

when the parcel fixing device 5, the clamp, is provided with the parcel, the using state recognizer for parcel fixing device, the pressure sensor, detects the output signal of the weight of the parcel, the central control machine judges that the parcels fixing device is in a using state; otherwise, the parcel fixing device is in an unoccupied state. When the correct input of the password recognition device is not needed, the parcel fixing device is changed from an using state to an unoccupied state, the central control machine judges that the parcel is wrongly picked up, the parcel fixing device is wrongly opened, and alarm information is sent out.

Similarly, the identification process of the using state recognizer 25 for the hanging member 6 is as follows:

when the hanging member, the elastic telescopic rope, is provided with the parcel, the using state recognizer 25 for the hanging member 6, the elastic force sensor 13, is used for detecting the output signal for elasticity of the telescopic rope, the central control machine judges that the hanging member is in an using state; otherwise, the hanging member is in an unoccupied state. When the correct input of the password recognition device is not needed, the hanging member is changed from the use state to the unoccupied state, the central control machine judges that parcel is wrongly picked up, the hanging member is cut off, and alarm information is sent out.

Embodiment 4

Figure 5:
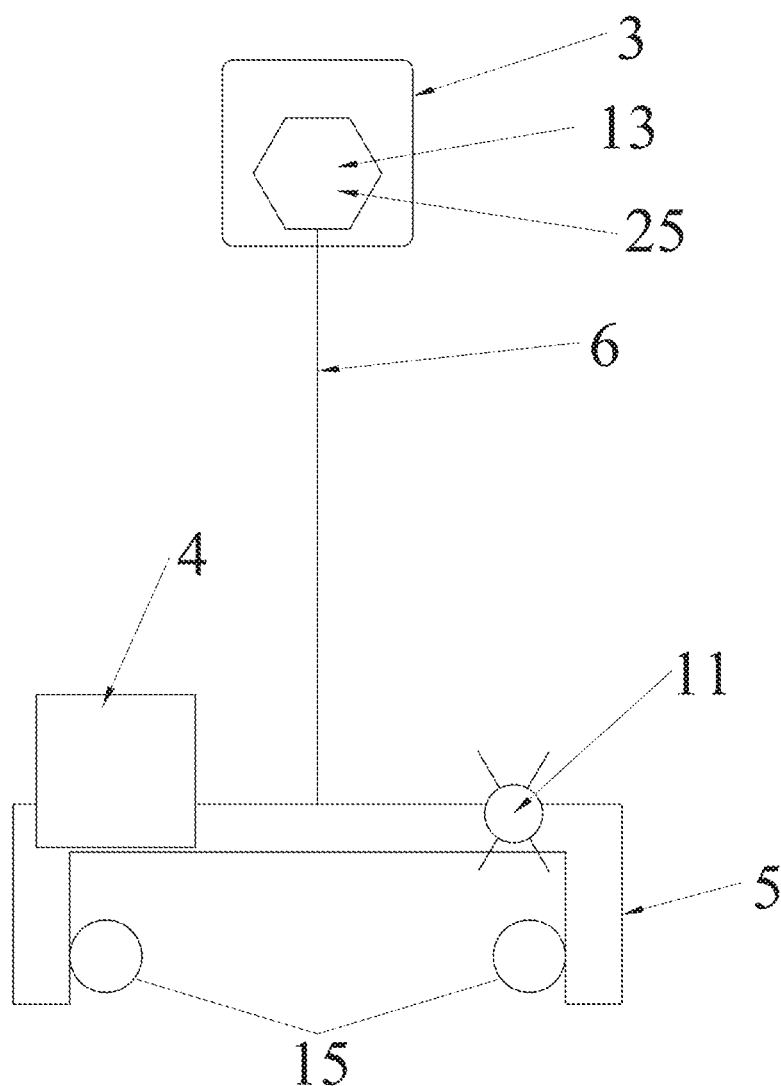
FIG. 5 is a schematic diagram of the connection relation between the light sensor, the elastic force sensor and the parcel fixing device according to an embodiment.
Figure 6:
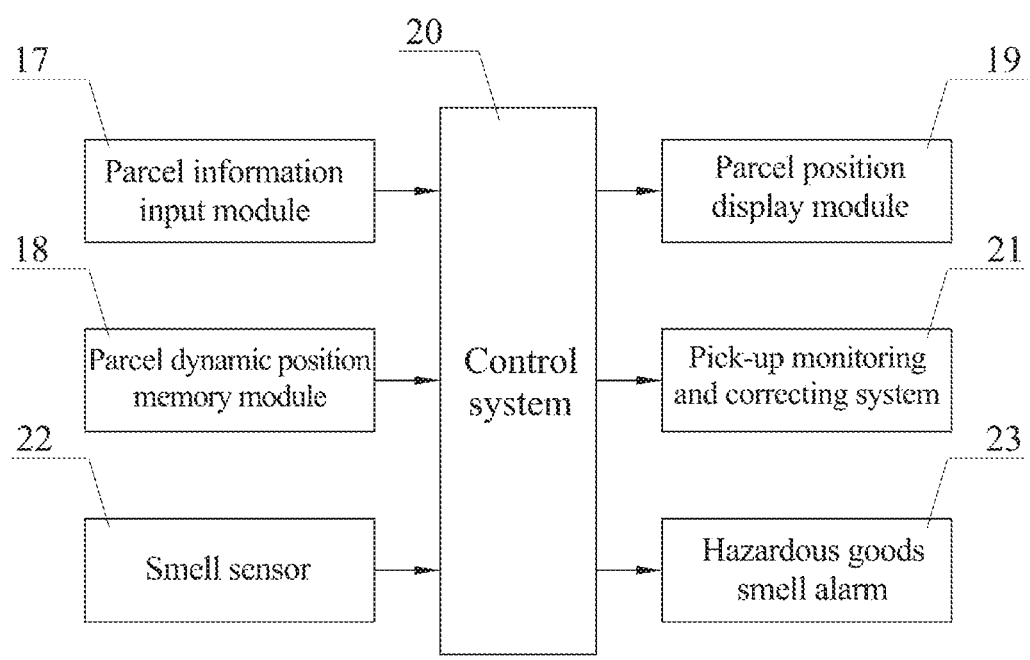
FIG. 6 is a functional block diagram of the logistics rack of an embodiment.
Figure 7:
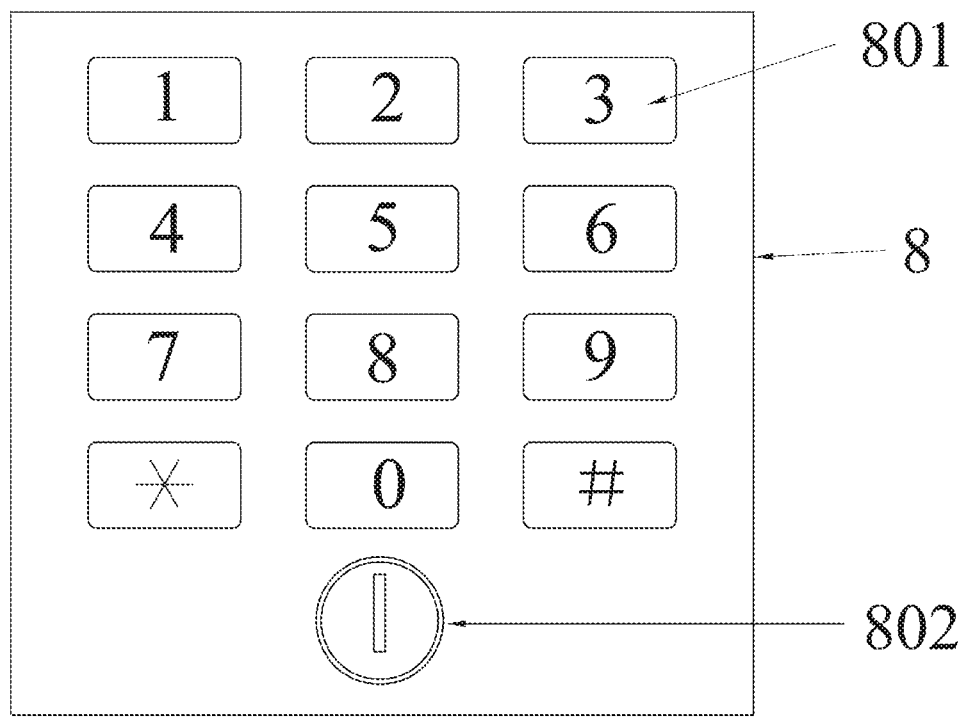
FIG. 7 is a structural diagram of a password recognition device.

The basic structure of the logistics rack is the same with that of embodiment 3, and the differences are as follows:

the using state recognizer for the parcel fixing device 5 is a light sensor 15, the light sensor 15 is installed on the parcel fixing device 5 (see FIG. 5) and is used for identifying the using state of the parcel fixing device 5 and judging whether the parcel fixing device 5 is wrongly opened or not, the output end of the light sensor is connected with the input end of the central control machine, and when the parcel fixing device 5 is provided with the parcel, the light sensor does not feel light, the center control machine records parcel fixing device is in a using state, and otherwise, the light sensor is in an unoccupied state.

Figure 4:
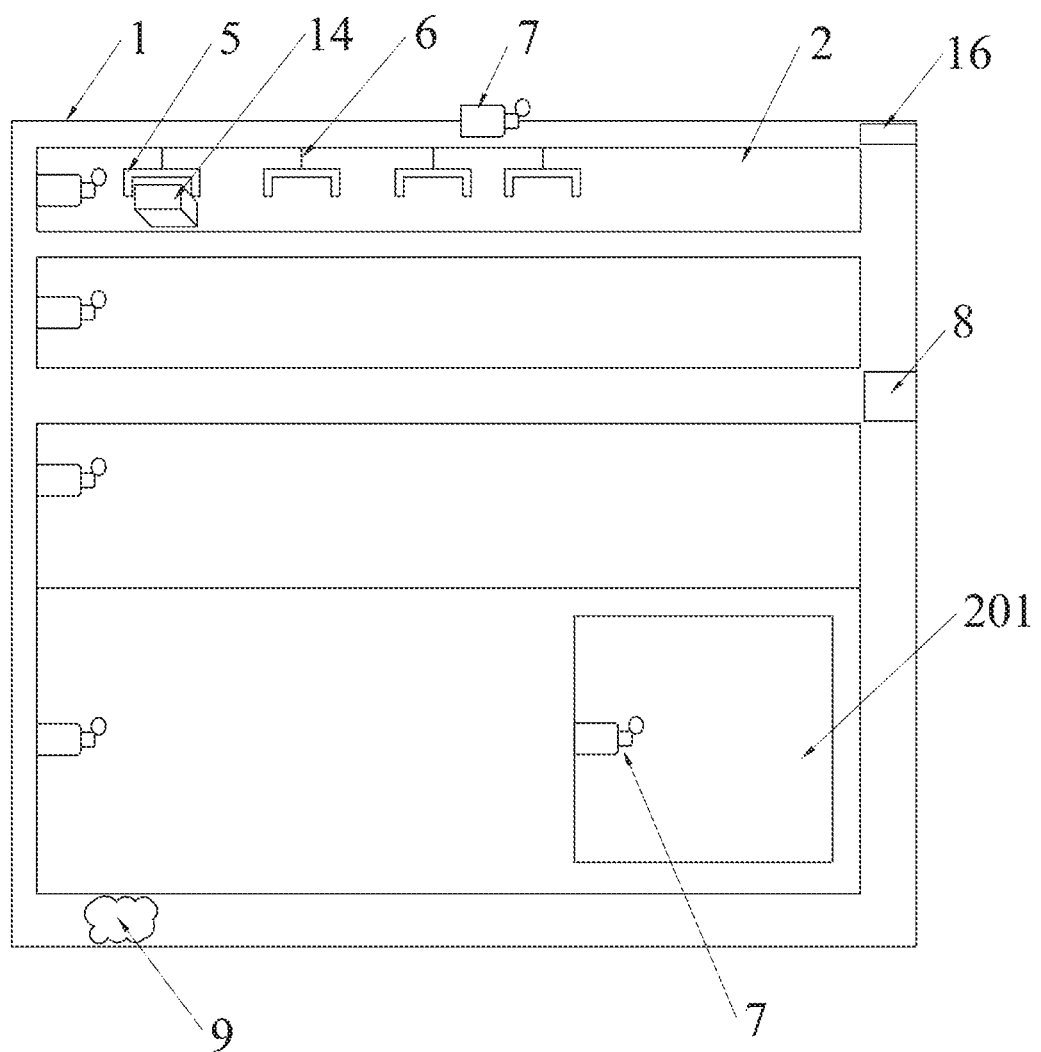
FIG. 4 is a structural schematic diagram of a logistics rack according to an embodiment of the present invention.

The central control computer 9 is further connected with the Internet; and the logistics rack is provided with an APP application platform, and each logistics rack is further provided with a unique number encoded card 16 which is convenient for APP application platform management (see FIG. 4).

The method of using the logistics rack in the embodiment 4 comprises the following steps:

step a, the parcel dispatcher register in advance through the web page or the APP application platform to apply for the secret key of opening the cabinet door of logistics rack;

step b, the parcel dispatcher sends the message of the recipient and the number corresponding to the parcel fixing device to the control system through the keyboard, after receiving the information, the control system automatically generates a dynamic secret key and parcel information (such as a company parcel dispatcher in a certain time to your shipment placed in a logistics cabinet, the cabinet password is XXXXXX) and sends it to the recipient;

step c, the recipient also pre-register through the web page or APP application platform, when the parcel is available, the secret key of opening the cabinet door can be queried or instantly received, and the user can open the cabinet door through the secret key, the parcel fixing device and one of the plurality of first encoded cards of the recipient on the logistics rack are automatically flashing, after the recipient compares the received numbers with the numbers sent by the control system, the parcel is picked up, and the elastic hanging member is automatically reset;

step d, the control system sends the information to the parcel dispatcher after the parcel is picked up;

in the process of the step a to the step c, the central control machine further identifies the using state of the parcel fixing device 5 and judges whether the parcel fixing device is wrongly opened or not through an using state recognizer for the parcel fixing device 15; judges whether the hanging member is cut or not through the using state recognizer 25 for the hanging member 6; all pictures of the express item from the storage to the collecting process are recorded through the camera 7; if abnormal conditions exist, the central control machine sends out alarm information; the identification process of the using state recognizer for parcel fixing device 5 is as follows:

when the parcel fixing device, the clamp, is provided with the parcel item, the using state recognizer for parcels fixing device 5, the pressure sensor, detects the output signal of the weight of the parcel, the central control machine judges that the parcel fixing device is in a using state; otherwise, the parcel fixing device is in an unoccupied state. When the correct input of the password recognition device is not needed, the parcel fixing device is changed from an using state to an unoccupied state, the central control machine judges that the parcel is wrongly picked up, the parcel fixing device is wrongly opened, and alarm information is sent out.

Similarly, the identification process of the using state recognizer for the hanging member is as follows:

when the hanging member—the elastic telescopic rope is provided with the parcel, the using state recognizer 25 for the hanging member 6 being a elastic force sensor 13 is used for detecting the output signal for elasticity of the telescopic rope, the central control machine judges that the hanging member is in a using state; otherwise, the hanging member is in an unoccupied state. When the correct input of the password recognition device is not needed, the hanging member is changed from the use state to the unoccupied state, the central control machine judges that wrongly picked up, the hanging member is cut off, and alarm information is sent out.

In the process of the step a to the step d, the parcel dispatcher and the recipient inquire the state of the parcel in the logistics rack after being registered by the webpage or the APP application platform.

Embodiment 5

The basic structure of the logistics rack is the same with that of embodiment 3, and the difference is that the logistic rack is further provided with WiFi.

The application method of the logistics rack is also basically the same with that of embodiment 4, and the difference is that in the step c, after the recipient logs in the APP application platform of the logistics rack, the recipient arrives at the WiFi area of logistics rack, the cabinet door is automatically opened, the parcel fixing device and one of plurality of the first encoded cards of the recipient on the logistics rack are automatically flashing, after the recipient compares the received numbers with the numbers sent by the control system, the parcel is picked up, and the elastic hanging member is automatically reset.

As a variation of the embodiment 1 to embodiment 5, the parcel fixing device 5 can be a clamp or a hook, and the using states of the clamp and the hook are recorded in the center control machine. The parcel is not damaged by inserting the hook into the parcel package, and the using state for the light sensor of the hook can be started.

As a conversion of the embodiment 1 to embodiment 5, the password recognition device can also be a bar code or a two-dimensional code scanning or fingerprint identification or face identification.

As a conversion of the embodiment 1 to embodiment 5, the parcel fixing device can be not provided with an encode card B.

Embodiment 6

A logistics rack comprises a cabinet frame 1, a parcel information input module 17, a parcel dynamic position memory module 18, a parcel position display module 19, a control system 20 and a pick-up monitoring and correcting system 21. The cabinet frame 1 is divided into a plurality of storage areas 2, the control system 20 is respectively connected with the parcel information input module 17, the parcel dynamic position memory module 18, the parcel position display module 19 and the pick-up monitoring and correcting system 21.

The parcel information input module 17 is used for inputting parcel information into the control system.

The parcel dynamic position memory module 18 is used for memorizing the position of a parcel placed in the cabinet frame and inputting the position information of a parcel into the control system to establish a relation between the control system and the parcel with the position information of the parcel; the parcel dynamic position memory module 18 cooperates with a weighing device; the weighing device comprises a total weighing device mounted on the bottom of the entire cabinet frame, an encoded area weighing device 202 mounted in each storage area 2 of the cabinet frame, one or more encoded area sub-weighing devices 203 respectively arranged on the same storage area of the cabinet frame.

The parcel position display module 19 is used for controlling the system to display the parcel position after retrieving the parcel information when the parcel is picked up, and the parcel position display module 19 includes a light display lamp mounted on the border of the cabinet frame.

When the recipient picks up the parcel, the position display module 19 correspondingly prompts the position of the parcel, the light display lamp automatically points to the position of the parcel, and the recipient can be reminded to quickly find his own parcel.

The pick-up monitoring and correcting system 21 is used for giving an alarm reminder after the parcel picked up is not matched with the information recorded by the parcel dynamic position memory module 18 when a parcel is picked up, that is, an alarm reminder after the weight of the weighing device is not matched with the weight information of the parcel when a parcel is picked up, and the pick-up monitoring and correcting system 21 comprises an alarm.

The logistics frame further comprises a smell sensor 22, the smell sensor 22 is connected with the control system 20, and the control system is further connected with a hazardous goods smell alarm 23, the dangerous goods smell alarm 23 can be replaced by the pick-up monitoring and correcting system.

The control system is further connected with the Internet; the logistics rack is provided with an APP application platform and WiFi, so that the invention has the following functions:

(1) the parcel dispatcher can apply a secret key of opening cabinet frame on a webpage or an APP application platform after registration;

(2) the parcel dispatcher can inquire the state of the parcel in the cabinet frame on a webpage or an APP application platform after registration;

(3) the recipient can inquire the state of the parcel in the cabinet frame on a webpage or an APP application platform after registration;

(4) the recipient can inquire and receive the secret key of cabinet frame on a webpage or an APP application platform after registration; and (5) the recipient can access the logistics network of the logistics company.

What is claimed is:

1. A logistics rack, comprising a cabinet frame (1); wherein the cabinet frame (1) is divided into a plurality of storage areas (2); a plurality of first encoded cards (3) are provided on the top of the cabinet frame (1); a hanging member (6) is connected with the bottom of each of the plurality of first encoded cards (3), and a parcel fixing device (5) is connected to the bottom of the hanging member (6).

2. The logistics rack according to claim 1, characterized in that the cabinet frame (1) is provided with a cabinet door (26) with a password recognition device (8); a control system (20) is mounted inside the cabinet frame (1), and the control system (20) comprises a central control machine (9); and the central control machine (9) communicates with the password recognition device (8).

3. The logistics rack according to claim 2, characterized in that the control system (20) further comprises a using state recognizer for the parcel fixing device (5), and the using state recognizer for the parcel fixing device (5) is mounted on the parcel fixing device (5) for identifying an opening state of the parcel fixing device (5); and the using state recognizer for the express fixing device (11) communicates with the central control machine (9).

4. The logistics rack according to claim 3, characterized in that the using state recognizer for the parcel fixing device (5) comprises a pressure sensor (12) or a light sensor (15); and the pressure sensor (12) or the light sensor (15) communicates with the central control machine (9).

5. The logistics rack according to claim 2, characterized in that the control system (20) further comprises a using state recognizer (25) for the hanging member (6) mounted on the hanging member (6) for judging whether the hanging member is cut or not; and the using state recognizer (25) for the hanging member (6) communicates with the central control machine (9).

6. The logistics rack according to claim 5, characterized in that the hanging member (6) is an elastic hanging member; a using state recognizer (25) for the hanging member (6) is an elastic force sensor (13); and the elastic force sensor (13) communicates with the central control machine (9).

7. The logistics rack according to claim 2, characterized in that the password recognition device (8) comprises a cabinet door lock and a keyboard; the central control system (9) communicates with the cabinet door lock; the keyboard is connected with the central control machine (9) for entering a telephone number of a recipient, so that parcel information is automatically generated and sent to the recipient by the central control machine (9).

8. The logistics rack according to claim 2, characterized in that a camera (7) is installed in the cabinet frame (1); wherein the camera is connected with the central control machine (9), and a monitoring image is stored by the control system.

9. The logistics rack according to claim 2, characterized in that the parcel fixing device (5) is provided with a second encoded card (4) with a same number of one of the first encoded cards (3); the using state recognizer for the parcel fixing device (5) is further provided with an indicator lamp, and an input end of the indicator lamp is connected with the output end of the central control machine (9), and the indicator lamp flickers on the using state recognizer for the parcel fixing device (5) when the recipient picks up a parcel.

10. The logistics rack according to claim 2, characterized in that each of the storage areas (2) of the cabinet frame (1) comprises a frozen area (201) for storing a fresh food parcel, a temperature controller (24) is installed in the frozen area (201), the temperature controller (24) is connected with the central control machine (9), and the temperature of the frozen area is monitored by the central control machine.

11. The logistics rack according to claim 2, characterized in that the central control machine (9) is further connected with the Internet; and the logistics rack is further provided with WiFi.

12. The logistics rack according to claim 2, characterized in that the logistics rack further comprises a parcel information input module (17), a parcel dynamic position memory module (18) and a parcel position display module (19); the control system is respectively connected with the parcel information input module (17), the parcel dynamic position memory module (18), and the parcel position display module (19); the parcel information input module (17) is configured to input parcel information into the control system, and the parcel dynamic position memory module (18) is configured to memorize the position of a parcel placed in the cabinet frame and input the position information of the parcel into the control system to establish a relationship between the control system and the parcel with the position information of the parcel; the object position display module (19) is configured to display the parcel position after the control system retrieves the position information of the parcel when a parcel is picked up.

13. The logistics rack according to claim 12, characterized in that the logistics rack further comprises a pick-up monitoring and correcting system; the pick-up monitoring and correcting system (21) is connected with the control system; the pick-up monitoring and correcting system (21) is configured to give an alarm reminder after a parcel taken away is not matched with information recorded by the object dynamic position memory module (18) when the parcel is picked up.

14. The logistics rack according to claim 2, characterized in that the logistics frame further comprises a smell sensor, the smell sensor is connected with the control system, and the control system is further connected with a hazardous goods smell alarm (23); the control system is further connected with the Internet; the logistics rack is further provided with WiFi.

15. An application method of a logistics rack, characterized by comprising the following steps:
"a" selecting a parcel fixing device (5) not clamping a parcel on the logistics rack by a parcel dispatcher, and clamping a parcel with a parcel fixing device (5);
"b" informing a recipient of a number on one of the plurality of first encoded cards (3) corresponding to the parcel fixing device (5); and
"c" picking up the parcel according to one of a plurality of first encode cards (3) corresponding to the parcel fixing device (5); wherein a hanging member (6) is connected with the bottom of each of the plurality of first encode cards (3), and the hanging member is connected with the parcel fixing device (5).

16. The application method of the logistics rack according to claim 15, characterized in that a cabinet door with a password recognition device is installed on the logistics rack, and the parcel dispatcher asks for a password from an owner of the logistics rack before the step "a", and the cabinet door on the logistics rack is opened by entering the password; and the recipient asks for a password from the owner of the logistics rack before the step "c", and the cabinet door on the logistics rack is opened by entering the password.

17. The application method of the logistics rack according to claim 15, characterized in that a cabinet door with a password recognition device is installed on the logistics rack, and a control system is installed in a cabinet frame (1); wherein
in the step "a" the parcel dispatcher asks for the password, and opens the cabinet door on the logistics rack by entering the password;
in the step "b" the parcel dispatcher enters information of the recipient and the number on one of the plurality of the first encoded cards (3) through a keyboard (8); the control system receives the information of recipient and the number on one of the plurality of the first encoded cards (3); and the control system generates automatically a password for the recipient and parcel information, and sends the password to the recipient;
in the step "c" when the control system opens the cabinet door according to the password sent by the control system, an indicator lamp (11) on the parcel fixing device (5) on the logistics rack flashes;
the application method further comprises step "d": sending information from the control system to the courier after the parcel is picked up; and
in a process of the step "a" to the step "c", a central control machine (9) further identifies a using state of the parcel fixing device (5) through a using state recognizer for the parcel fixing device (5); judges whether the hanging member is cut or not through a using state recognizer (25) for the hanging member (6).

* * * * *